United States Patent
Roy et al.

(10) Patent No.: US 9,425,483 B2
(45) Date of Patent: Aug. 23, 2016

(54) ELECTROLYTE SOLUTION, METHOD OF PREPARING THE SAME, AND MAGNESIUM BATTERY INCLUDING THE ELECTROLYTE SOLUTION

(71) Applicant: Samsung Electronics Co., Ltd., Suwon-si, Gyeonggi-do (KR)

(72) Inventors: Basab Roy, Hwaseong-si (KR); Dong-young Kim, Hwaseong-si (KR); Youn-hee Lim, Hwaseong-si (KR); Seok-soo Lee, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 274 days.

(21) Appl. No.: 14/254,998

(22) Filed: Apr. 17, 2014

(65) Prior Publication Data

US 2015/0140450 A1  May 21, 2015

(30) Foreign Application Priority Data

Nov. 21, 2013 (KR) .................. 10-2013-0142433

(51) Int. Cl.
| | |
|---|---|
| H01M 10/054 | (2010.01) |
| H01M 10/0566 | (2010.01) |
| H01M 10/0568 | (2010.01) |
| H01M 10/0569 | (2010.01) |

(52) U.S. Cl.
CPC ....... *H01M 10/0566* (2013.01); *H01M 10/054* (2013.01); *H01M 10/0568* (2013.01); *H01M 10/0569* (2013.01)

(58) Field of Classification Search
CPC ......... H01M 10/054; H01M 10/0566; H01M 10/0568
See application file for complete search history.

(56) References Cited

U.S. PATENT DOCUMENTS

| | | | |
|---|---|---|---|
| 6,316,141 | B1 | 11/2001 | Aurbach et al. |
| 8,354,193 | B2 | 1/2013 | Muldoon et al. |
| 9,325,004 | B2 | 4/2016 | Chang et al. |
| 2008/0182176 | A1 | 7/2008 | Aurbach et al. |
| 2011/0244338 | A1 | 10/2011 | Muldoon et al. |
| 2011/0244388 | A1* | 10/2011 | Uemura ................. G03G 9/107 430/111.1 |
| 2011/0262804 | A1* | 10/2011 | Muldoon .............. H01M 4/134 429/207 |
| 2012/0171577 | A1* | 7/2012 | Ryu ................... H01M 10/0567 429/326 |
| 2012/0219867 | A1 | 8/2012 | Nuli et al. |
| 2013/0034780 | A1* | 2/2013 | Muldoon .............. H01M 4/661 429/339 |
| 2013/0209894 | A1 | 8/2013 | Ryu et al. |
| 2014/0178773 | A1 | 6/2014 | Ryu et al. |
| 2015/0056515 | A1 | 2/2015 | Kim et al. |

FOREIGN PATENT DOCUMENTS

| | | |
|---|---|---|
| CN | 101320806 A | 12/2008 |
| WO | 2011150093 A1 | 12/2011 |

OTHER PUBLICATIONS

Aurbach et al, "Prototype systems for rechargeable magnesium batteries", Nature, vol. 407, Oct. 12, 2000, pp. 724-727.
Kim et al., "Structure and compatibility of a magnesium electrolyte with a sulphur cathode", Nature Communications, 2011, pp. 1-6.
Liebenow et al., "The electrodeposition of magnesium using solutions of organomagnesium halides, amidomagnesium halides and magnesium organoborates", Electrochemistry Communications, vol. 2, 2000, pp. 641-645.
Mizrahi et al, "Electrolyte Solutions with a Wide Electrochemical Window for Rechargeable Magnesium Batteries", Journal of the Electrochemical Society, vol. 155, Issue 2, 2008, pp. A103-A109.
D. Aurbach et al. "Prototype systems for rechargeable magnesium batteries", Nature, vol. 407, 2000, 4 pp.
Hee Soo Kim et al. "Structure and compatibility of a magnesium electrolyte with a sulphur cathode", Nature Communications, 2011, 6 pp.
Hyun Deog Yoo et al. "Mg rechargeable batteries: an on-going challenge", Energy Environ. Sci., 2013, 6, 2265-2279.
John Muldoon et al. "Electrolyte roadblocks to a magnesium rechargeable battery", Energy Environ. Sci., 2012, 5, 5941-5950.
L.W. Gaddum et al. "The Electrolysis of Grignard Solutions", Nelson and Evans, This Hournal, 39, 82 (1917) 5 pp.

* cited by examiner

*Primary Examiner* — Ula C Ruddock
*Assistant Examiner* — Thomas Parsons
(74) *Attorney, Agent, or Firm* — Cantor Colburn LLP

(57) ABSTRACT

An electrolyte solution including a non-aqueous organic solvent and a magnesium salt represented by Formula 1:

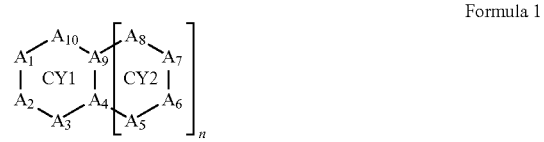

Formula 1 wherein in Formula 1, groups CY1, CY2, $A_1$ to $A_{10}$, and variable n are defined in the specification.

20 Claims, 3 Drawing Sheets

ELECTROLYTE SOLUTION, METHOD OF PREPARING THE SAME, AND MAGNESIUM BATTERY INCLUDING THE ELECTROLYTE SOLUTION

CROSS-REFERENCE TO RELATED APPLICATIONS

This application claims priority to Korean Patent Application No. 10-2013-0142433, filed on Nov. 21, 2013, and all the benefits accruing therefrom under 35 U.S.C. §119, the content of which is incorporated herein in its entirety by reference.

BACKGROUND

1. Field

The present disclosure relates to an electrolyte solution, a method of preparing the same, and a magnesium battery including the electrolyte solution.

2. Description of the Related Art

Recently, there has been an increasing interest in materials for power storage batteries.

Magnesium batteries are price competitive, environmentally friendly energy storage devices, having high energy storage characteristics, as compared to existing lithium batteries, lead storage batteries, nickel-cadmium (Ni—Cd) batteries, nickel-hydrogen batteries, and nickel-zinc batteries. Magnesium batteries have been increasingly researched.

In general, a magnesium battery includes a cathode containing a metal sulfide-based active material, such as $Mo_3S_4$, in bulk form, an anode containing a magnesium based active material, such as magnesium or an alloy thereof, and an electrolyte solution including a magnesium salt dissolved in an organic solvent.

Since the electrolyte solution contacts a material forming a positive electrode or a negative electrode, a chemical reactivity of the electrolyte solution needs to be controlled to avoid a formation of a film on a negative electrode, which may stop an electrochemical reaction.

Generally, it is known that an electrolyte solution including a Grignard-based magnesium salt does not form a film on a negative electrode.

However, the electrolyte solution including a Grignard-based magnesium salt is electrochemically unstable due to the presence of cations, such as $RMg^+$ in the electrolyte solution at an equilibrium state.

Therefore, a new electrolyte solution including a magnesium salt that is electrochemically stable and has improved life characteristics by increasing reversibility between deposition and dissolution of magnesium is needed.

SUMMARY

Provided are an electrolyte solution that is electrochemically stable and can improve life characteristics by increasing reversibility between deposition and dissolution of magnesium and methods and apparatuses for preparing the electrolyte solution.

Provided are methods and apparatuses for preparing an electrolyte solution that is industrially applicable in mass production.

Provided are methods and apparatuses for a magnesium battery including the electrolyte solution that is electrochemically stable and can improve lifespan characteristics by increasing reversibility between deposition and dissolution of magnesium.

Additional aspects will be set forth in part in the description which follows and, in part, will be apparent from the description, or may be learned by practice of the presented embodiments.

According to an aspect, an electrolyte solution includes a non-aqueous organic solvent; and a magnesium salt represented by Formula 1:

Formula 1

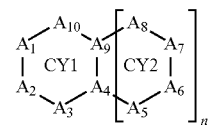

wherein, in Formula 1,

CY1 is a C5 to C6 aromatic ring, a C5 to C6 heterocyclic ring, or a C5 to C6 alicyclic ring, and CY2 is a C4 to C6 aromatic ring, a C4 to C6 heterocyclic ring, or a C4 to C6 alicyclic ring;

n is 0 or 1;

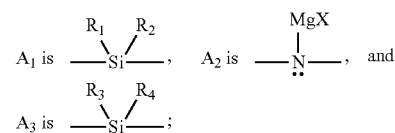

$A_4$ and $A_9$ are each independently

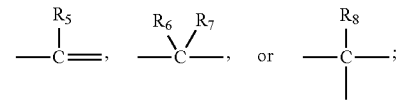

$A_5$ and $A_6$ are each independently

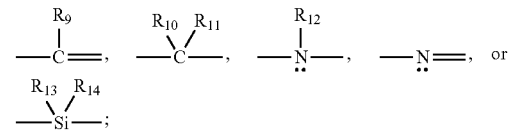

$A_7$ and $A_8$ are each independently a single bond,

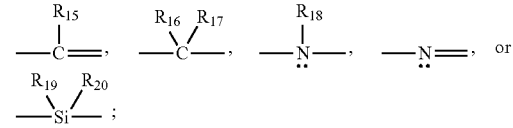

$A_{10}$ is a single bond,

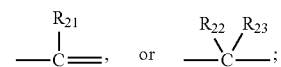

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and X is a halogen atom.

According to another aspect, a method of preparing an electrolyte solution includes contacting the magnesium salt represented by Formula 1 and a non-aqueous organic solvent to prepare an electrolyte solution comprising the magnesium salt represented by Formula 1:

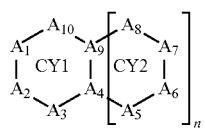

Formula 1 wherein, in Formula 1,

CY1 is a C5 to C6 aromatic ring, a C5 to C6 heterocyclic ring, or a C5 to C6 alicyclic ring, and CY2 is a C4 to C6 aromatic ring, a C4 to C6 heterocyclic ring, or a C4 to C6 alicyclic ring;

n is 0 or 1;

$A_1$ is

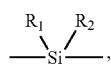

$A_2$ is and

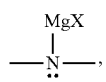

$A_3$ is

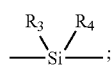

$A_4$ and $A_9$ are each independently

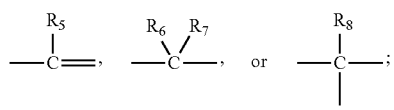

$A_5$ and $A_6$ are each independently

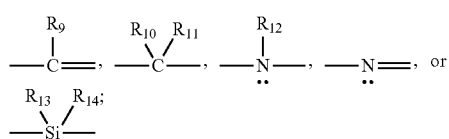

$A_7$ and $A_8$ are each independently a single bond,

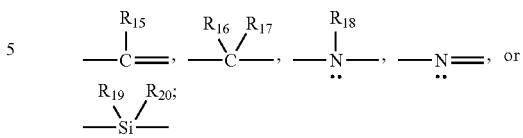

$A_{10}$ is a single bond,

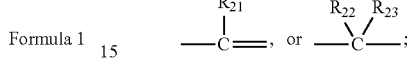

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and X is a halogen atom.

According to another aspect, a magnesium battery includes a positive electrode including a positive electrode active material for intercalating or deintercalating magnesium ions;

a negative electrode including a negative electrode active material for intercalating or deintercalating magnesium ions; and the electrolyte solution as described above disposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
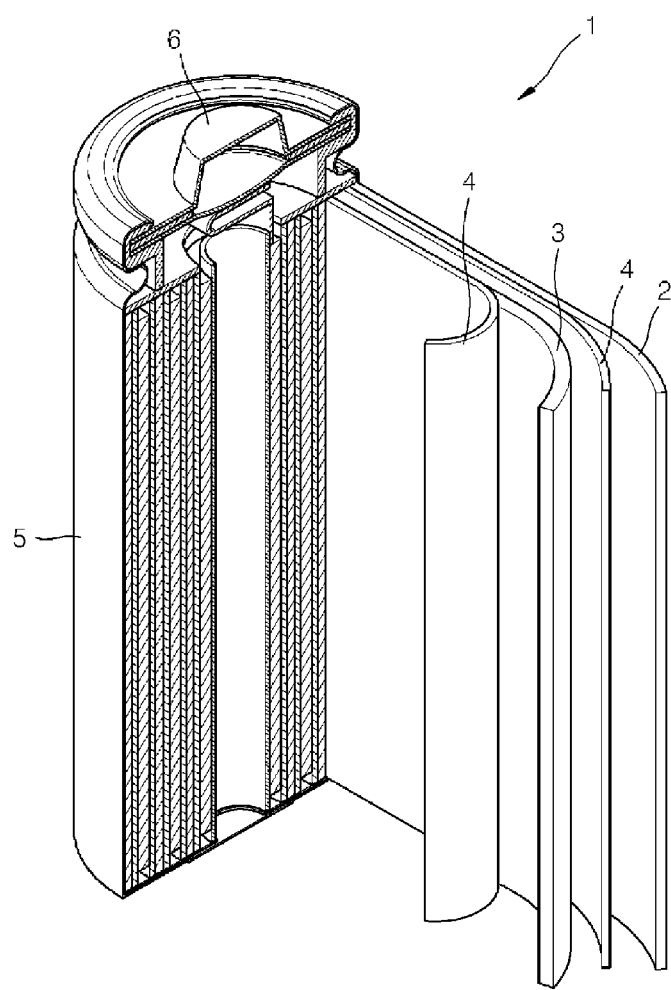
FIG. 1 is a schematic view of a magnesium battery 1 according to an embodiment.

Hereinafter, an electrolyte solution according to an embodiment, a method of preparing the same, and a magnesium battery including the electrolyte solution will be described in detail. Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect, an electrolyte solution according to an embodiment includes a non-aqueous organic solvent and a magnesium salt represented by Formula 1:

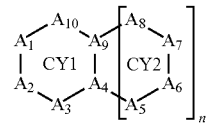

Formula 1

In Formula 1,

CY1 is a C5 to C6 aromatic ring, a C5 to C6 heterocyclic ring, or a C5 to C6 alicyclic ring, and CY2 is a C4 to C6 aromatic ring, a C4 to C6 heterocyclic ring, or a C4 to C6 alicyclic ring;

n is 0 or 1;

$A_1$ is

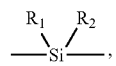

$A_2$ is

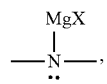

and $A_3$ is

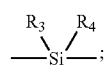

$A_4$ and $A_9$ are each independently

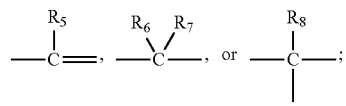

$A_5$ and $A_6$ are each independently

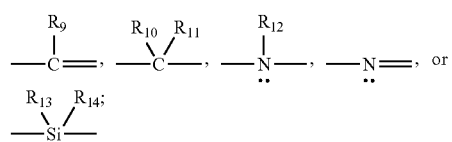

$A_7$ and $A_8$ are each independently a single bond,

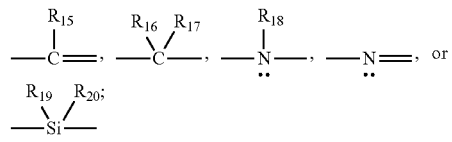

$A_{10}$ is a single bond,

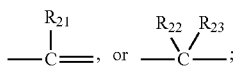

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and X may be a halogen atom.

As used in Formula 1, the term "substituted" in relation to an alkyl group, a cycloalkyl group, an aryl group, and a heteroaryl group refers to a group substituted with a halogen atom, a C1-C10 alkyl group substituted with a halogen atom (e.g., $CCF_3$, $CHCF_2$, $CH_2F$, or $CCl_3$), a hydroxyl group (—OH), a nitro group (—$NO_2$), a cyano group (—CN), an amino group (—$NO_2$), an amidino group, a hydrazine group, a hydrazone group, a carboxylic acid or a salt thereof, a sulfonic acid or a salt thereof, a phosphoric acid or a salt thereof, a C1-C10 alkyl group, a C1-C10 heteroalkyl group, a C6-C10 aryl group, a C6-C10 heteroaryl group, or a C6-C10 heteroarylalkyl group.

As used herein, when specific definition is not otherwise provided, the term "hetero" refers to a group wherein one or more carbons are replaced with 1 to 3 hetero atoms selected from nitrogen (N), oxygen (O), sulfur (S), and phosphorus (P).

As used herein, when specific definition is not otherwise provided, the term "alkyl" refers to a group derived from a linear or branched chain saturated aliphatic hydrocarbon and having the specified number of carbon atoms.

Examples of the linear C1-C10 alkyl group in Formula 1 may include methyl, ethyl, and propyl. Examples of the branched C1-C10 alkyl group in Formula 1 may include sec-butyl, tert-butyl, neo-butyl, and iso-amyl.

As used herein, when specific definition is not otherwise provided, the term "alkylene" refers to a straight or branched chain, saturated, divalent aliphatic hydrocarbon group having a specified number of carbon atoms.

As used herein, when specific definition is not otherwise provided, the term "cycloalkyl" refers to a group derived from a cyclic hydrocarbon having one or more saturated rings, wherein all ring members are carbon and having a specified number of carbon atoms.

Examples of the C3-C10 cycloalkyl group in Formula 1 may include cyclopropyl, cyclobutyl, cyclopentyl, and cyclohexyl.

As used herein, when specific definition is not otherwise provided, the term "aryl" refers to a hydrocarbon group having an aromatic ring, and having a specified number of carbon atoms.

The C6-C10 aryl group in Formula 1 is used alone or in combination and thus denotes an aromatic system including at least one ring. Examples of the C6-C10 aryl group may include phenyl, naphthyl, and tetrahydronaphthyl.

As used herein, when specific definition is not otherwise provided, the term "heteroaryl" refers to a carbocyclic ring group that includes one or more aromatic rings, wherein at least one ring member is a heteroatom, and having a specified number of carbon atoms.

The C6-C10 heteroaryl group in Formula 1 includes at least one hetero atom selected from N, O, P, and S and denotes an organic compound, in which the remaining ring atom is carbon. An example of the C6-C10 heteroaryl group may include pyridyl.

As used herein, when specific definition is not otherwise provided, the term "heteroarylalkyl" refers to a heteroaryl group linked via an alkylene moiety, and having a specified number of carbon atoms. An example of the C6-C10 heteroaryl group may include pyridylmethyl.

X is a halogen atom which may be F, Cl, Br, or I.

As used herein, when a definition is not otherwise provided, the term "aromatic group" refers to a substituent including all elements of the cycle having p-orbitals which form conjugation, and having a specified number of carbon atoms.

As used herein, when a definition is not otherwise provided, the term "aliphatic group" refers to a saturated or unsaturated linear or branched hydrocarbon group, and having a specified number of carbon atoms.

As used herein, when a definition is not otherwise provided, the term "alicyclic group" refers to a cyclic hydrocarbon having properties of an aliphatic group, and having a specified number of carbon atoms.

As used herein, when a definition is not otherwise provided, the term "heterocyclic group" refers to a cyclic hydrocarbon having properties of an aliphatic group, and having a specified number of carbon atoms, wherein at least one of the carbon atoms is substituted with a heteroatom.

In general, a conventional magnesium battery includes a positive electrode, a negative electrode, and an ion conductive electrolyte solution, wherein a known ion conductive electrolyte solution is an electrolyte solution of a Grignard-based magnesium salt (RMgX, where R is an alkyl group or an aryl group, and X is Cl or Br) that does not form a film on a negative electrode. Electrochemical reactions of the magnesium battery may be represented as follows:

Positive electrode: $Mg \leftrightarrow Mg^{2+} + 2e^-$

Negative electrode: $Mg_y MX + zMg^{2+} \leftrightarrow Mg_{y+z} MX + 2e^-$

That is, magnesium ions pass the electrolyte solution as electrons are released to an outer circuit from the negative electrode (oxidation) while discharging the magnesium battery, and electrons are regained as magnesium ions move to and plate on the negative electrode while charging the magnesium battery (reduction).

Lifespan characteristics of the electrolyte solution according to an embodiment may be improved as reversibility between deposition and dissolution of magnesium is increased by having an oxidation potential in a larger range than that of the conventional electrolyte solution of a Grignard-based magnesium salt (RMgX, where R is an alkyl group or an aryl group, and X is Cl or Br).

The electrolyte solution according to an embodiment may include a magnesium salt represented by Formula 2:

Formula 2

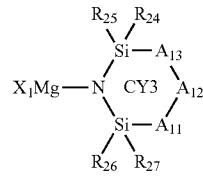

In Formula 2,

CY3 is a C5 to C6 aromatic ring, a C5 to C6 heterocyclic ring, or a C5 to C6 alicyclic ring;

$A_{11}$ and $A_{12}$ are each independently

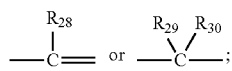

$A_{13}$ is a single bond,

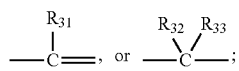

$R_{24}$ to $R_{33}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and $X_1$ may be a halogen atom, wherein the halogen atom may be, for example, Cl or Br.

As used in Formula 2, the term "substituted" in relation to an alkyl group, a cycloalkyl group, an aryl group, and a heteroaryl group refers to the same substitution as described above as used in Formula 1.

The magnesium salt represented by Formula 2 has a Si—N—Si ring-type non-nucleophilic structure. In this structure, two Si atoms with abundant electrons are located near a N atom, and thus steric hindrance effect occurs around the Si atoms. Therefore, while chemical reactivity of the electrolyte solution is maintained, the electrolyte solution including the magnesium salt represented by Formula 2 may be electrochemically stable. Also, the electrolyte solution including the magnesium salt represented by Formula 2 may have a wide range of oxidation potential due to the ring-type non-nucleophilic structure of a low HOMO energy level. In addition, the magnesium salt represented by Formula 2 may have reduced chemical reactivity so as a film is not formed on the negative electrode, thus increasing reversibility between deposition and dissolution of magnesium. Therefore, lifespan characteristics of the electrolyte solution including the magnesium salt may be improved.

However, a Si—N—Si linear-type non-nucleophilic structure has a low oxidation potential which is about 2.0 volts (V) (vs. Mg/Mg$^{2+}$). Thus a magnesium salt having the Si—N—Si linear-type non-nucleophilic structure may be unstable at a high voltage compared to a magnesium salt having a Si—N—Si ring-type non-nucleophilic structure.

Also, when bis(trifluoromethylsulfonyl)imide, which is known as a salt that may supplement the Grignard-based magnesium salt, is included in an electrolyte solution, HF may be produced from —SO$_2$—CF$_3$ at a terminal of bis (trifluoromethylsulfonyl)imide in the presence of air. The produced HF reacts with magnesium, and may precipitate MgF$_2$ from the electrolyte solution. In this regard, reversibility between deposition and dissolution of the magnesium in the electrolyte solution is decreased, and thus lifespan characteristics of the electrolyte solution may be deteriorated.

The electrolyte solution according to an embodiment may include a magnesium salt represented by Formula 3:

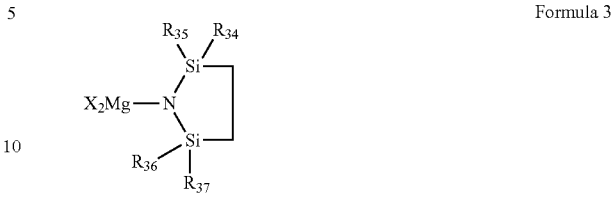

Formula 3

In Formula 3, $R_{34}$ to $R_{37}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and $X_2$ may be a halogen atom, wherein the halogen atom may be Cl or Br.

As used in Formula 3, the term "substituted" in relation to an alkyl group, a cycloalkyl group, an aryl group, and a heteroaryl group refers to the same substitution described above as used in Formula 1.

The electrolyte solution according to an embodiment may include a magnesium salt represented by Formula 4:

Formula 4

In the electrolyte solution according to an embodiment, a concentration of a magnesium salt may be in a range of about 0.01 molar (M) to about 2.0 M. For example, a concentration of the magnesium salt in the electrolyte solution may be in a range of about 0.01 M to about 1.5 M, for example about 0.01 M to about 1.0 M. When the magnesium salt is dissolved in a non-aqueous organic solvent at a concentration within these ranges above, dissociation of magnesium ions may be facilitated.

Examples of the non-aqueous organic solvent may include at least one selected from the group consisting of tetrahydrofuran (THF), 2-methyltetrahydrofuran, 2-methylfuran, ethyl alcohol, 4-methyldioxolane, 1,3-dioxolane, 1,4-dioxane, 1,2-dimethoxyethane, dimethoxymethane, ethylenecarbonate, propylenecarbonate, γ-butyrolactone, methylformate, sulfolane, 3-methyl-2-oxazolidinone, dimethyl carbonate, hexane, toluene, dimethyl ether, diethyl ether, methylethyl ether, propyl ether, methylpropyl ether, isopropyl ether, methylisopropyl ether, ethylene glycol dimethyl ether, diethyleneglycol dimethyl ether, bis(2-methoxyethyl) ether, and tetraethylene glycol, but are not limited thereto, and any non-aqueous organic solvent available in the art may be used.

The electrolyte solution may include the non-aqueous organic solvent; the magnesium salt represented by Formula 1; and a Lewis acid.

As a Mg positive ion complex including a halogen atom, e.g., Cl, is dominantly present, the electrolyte solution including the Lewis acid may have a stable magnesium deposition path compared to an electrolyte solution without a Lewis acid.

Examples of the Lewis acid may include at least one selected from $AlCl_3$, $AlCl_xR'_{3-x}$, $BCl_3$, $BCl_xR'_{3-x}$, and $B(OR')_3$, wherein x may be 0, 1, 2, or 3; and R' may be a substituted or unsubstituted linear C1-C10 alkyl group, a substituted or unsubstituted branched C3-C10 alkyl group, a substituted or unsubstituted C3-C10 cycloalkyl group, or a substituted or unsubstituted C6-C10 aryl group.

A range of an oxidation potential of the electrolyte solution including the Lewis acid may be further widened, and thus reversibility between deposition and dissolution of the magnesium may be increased. In this regard, lifespan characteristics of a magnesium battery including the electrolyte solution may be improved.

In the electrolyte solution, a molar ratio of the magnesium salt represented by Formula 1 and the Lewis acid may be in a range of 1:10 to 10:1. For example, in the electrolyte solution, a molar ratio of the magnesium salt represented by Formula 1 and the Lewis acid may be in a range of 1:8 to 8:1. For example, in the electrolyte solution, a molar ratio of the magnesium salt represented by Formula 1 and the Lewis acid may be in a range of 1:3 to 3:1. When a molar ratio of the magnesium salt represented by Formula 1 and the Lewis acid is within these ranges, reversibility between deposition and dissolution of the magnesium and lifespan characteristics of the electrolyte solution may be significantly improved.

In another aspect, a method of preparing an electrolyte solution includes introducing a magnesium salt represented by Formula 1 below to a non-aqueous organic solvent to prepare an electrolyte solution of a magnesium salt solution represented by Formula 1 below:

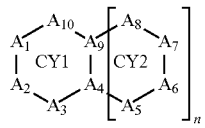

Formula 1

In Formula 1,

CY1 is a C5 to C6 aromatic ring, a C5 to C6 heterocyclic ring, or a C5 to C6 alicyclic ring, and CY2 is a C4 to C6 aromatic ring, a C4 to C6 heterocyclic ring, or a C4 to C6 alicyclic ring;

n is 0 or 1;

$A_1$ is

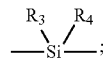

$A_2$ is

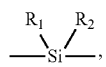

and $A_3$ is

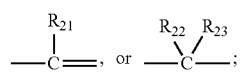

$A_4$ and $A_9$ are each independently

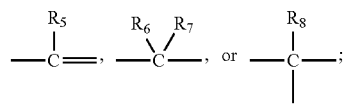

$A_5$ and $A_6$ are each independently

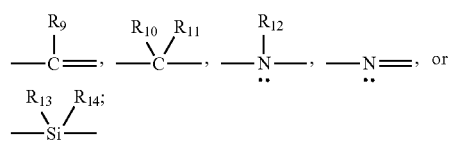

$A_7$ and $A_8$ are each independently a single bond,

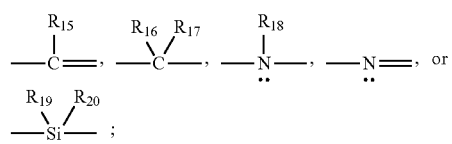

$A_{10}$ is a single bond,

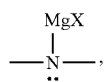

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and X may be a halogen atom.

After preparing the electrolyte solution of a magnesium salt solution represented by Formula 1, the method may further include adding a Lewis acid solution to the electrolyte solution of a magnesium salt represented by Formula 1. The Lewis acid is the same as described above, and thus the description of the Lewis acid is omitted here.

The preparing of the electrolyte solution including the magnesium salt and the adding a Lewis acid solution to the electrolyte solution of a magnesium salt represented by Formula 1 may be performed under an inert atmosphere. The inert atmosphere may be maintained, for example, in a glove box under argon atmosphere. The inert atmosphere minimizes contact with moisture and oxygen in air, and thus occurrence of chemical side reactions may be limited to the minimum. The magnesium salt has a Si—N—Si ring-type non-nucleophilic structure, and thus a yield of the magnesium salt may be high since a separate crystallization process is not necessary, unlike the case when the magnesium salt has a Si—N—Si linear-type non-nucleophilic structure. Thus, a bulk production of the magnesium salt is possible.

In the electrolyte solution, a molar ratio of the magnesium salt represented by Formula 1 and the Lewis acid may be in a range of 1:10 to 10:1. For example, a molar ratio of the magnesium salt represented by Formula 1 and the Lewis acid may be in a range of 1:8 to 8:1. For example, a molar ratio of the magnesium salt represented by Formula 1 and the Lewis acid may be in a range of 1:3 to 3:1. When a molar ratio of the magnesium salt represented by Formula 1 and the Lewis acid is within these ranges, reversibility between deposition and dissolution of the magnesium and lifespan characteristics of the electrolyte solution may be significantly improved.

According to another embodiment, provided is a magnesium battery including a positive electrode including a positive electrode active material for intercalating/deintercalating magnesium ions;

a negative electrode including a negative electrode active material for intercalating/deintercalating magnesium ions; and the electrolyte solution disposed between the positive electrode and the negative electrode, wherein the electrolyte solution is described above.

The magnesium battery may be prepared as follows.

First, the positive electrode may be prepared as follows.

For example, a positive electrode active material, a conducting agent, a binder, and a solvent are mixed to prepare a positive electrode active material composition. The positive electrode active material composition may be directly coated on a metallic current collector to prepare a positive electrode plate. Alternatively, the positive electrode active material composition may be cast on a separate support to form a positive electrode active material film, which may then be separated from the support and laminated on a metallic current collector to prepare a positive electrode plate. The positive electrode is not limited to the examples described above, and may be one of a variety of types.

The positive electrode active material may include at least one selected from an oxide compound of a metal element, a halogen compound of a metal element, a sulfide compound of a metal element, a selenium compound of a metal element, a phosphate compound of a metal element, a phosphide compound of a metal element, and a diboride compound of a metal element. The metal element may be at least one selected from scandium (Sc), titanium (Ti), vanadium (V), chromium (Cr), manganese (Mn), iron (Fe), cobalt (Co), molybdenum (Mo), lead (Pb), ruthenium (Ru), tungsten (W), zirconium (Zr), nickel (Ni), copper (Cu), and zinc (Zn).

The positive electrode active material may include at least one selected from the group consisting of $Co_3O_4$, $Mn_2O_3$, $Mn_3O_4$, $MoO_3$, $PbO_2$, $Pb_3O_4$, $RuO_2$, $V_2O_5$, $WO_3$, $Mg_2MnSiO_4$, $TiS_2$, $NiS_2$, $FeS_2$, $VS_2$, $ZrS_2$, $Mo_3O_4$, $Mo_6S_5$, $Mo_6Se_8$, $MoS_6Se_2$, $MoB_2$, $TiB_2$, and $ZrB_2$.

The positive electrode active material may further include a conventional positive electrode active material or a magnesium composite metal oxide in addition to the positive electrode active material described above. An example of the magnesium composite metal oxide may be a magnesium-based compound represented by $Mg(M_{1-x}A_x)O_4$ (where, $0 \le x \le 0.5$, M is Ni, Co, Mn, Cr, V, Fe, Cu, or Ti, and A is Al, B, Si, Cr, V, C, Na, K, or Mg).

The conducting agent may be at least one of carbon material having a high specific surface area, for example, carbon black, active carbon, acetylene black, graphite particulates, and a mixture thereof. Also, the conducting agent may be fiber prepared by carbonizing vapor growth carbon or pitch (by-product of petroleum, coal, or coal tar) at a high temperature, or electrically conductive fiber, such as carbon fiber prepared from acryl fiber (polyacrylonitrile). Carbon fiber and a carbon material having a high specific surface area may be simultaneously used as the conducting agent. By using the carbon fiber and a carbon material having a high specific surface area simultaneously, conductivity of the conducting agent may be increased. Also, a metal-based conducting agent may be used as the conducting agent since the metal-based conducting agent is not oxidized and dissolved within a charging/discharging range of the positive electrode and has an electric resistance lower than that of the positive electrode active material. For example, the metal-based conducting agent may be a corrosion-resistive metal, such as titanium or gold, a carbide, such as SiC or WC, and a nitride, such as $Si_3N_4$ or BN, but the metal-based conducting agent is not limited thereto, and any conducting agent available in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but the binder is not limited thereto, and any material available as a binding agent in the art may be used.

Examples of the solvent are N-methyl-pyrrolidone (NMP), acetone, and water, but the solvent is not limited thereto, and any material available as a solvent in the art may be used.

The metallic current collector may use an electrochemically stable material without being limited by a material, a shape, or a manufacturing method. The metallic current collector may be an aluminum film having a thickness of about 10 micrometers (μm) to about 100 μm, an aluminum porous film having a thickness of about 10 μm to about 100 μm and a pore diameter of about 0.1 millimeters (mm) to about 10 mm, an extension metal, or a foam metal plate. A material of the metallic current collector may be stainless steel or titanium as well as aluminum.

Amounts of the positive electrode active material, the conducting agent, the binder, and the solvent may be the amounts generally used in magnesium batteries. At least one of the conducting agent, the binder, and the solvent may not be used according to the use and the structure of the magnesium battery.

Next, a negative electrode is prepared.

The negative electrode of the magnesium battery may include at least one selected from a magnesium metal, a magnesium metal-based alloy, a magnesium-intercalating compound, and a carbon-based material, but the negative electrode is not limited thereto. Any material available as a negative electrode active material in the art that includes magnesium or is capable of intercalating/deintercalating magnesium may be used.

The negative electrode determines the capacity of the magnesium battery. In this regard, the negative electrode may be a magnesium metal. Examples of the magnesium metal-based alloy may include alloys of magnesium with aluminum (Al), tin (Sn), indium (In), calcium (Ca), titanium (Ti), vanadium (V), and combinations thereof.

For example, the negative electrode may be a magnesium metal having a thickness of from about 3 μm to about 500 μm, which may be in any of a variety of forms, including a film, a sheet, a foil, a net, a porous structure, a foam, and a non-woven fabric.

An oxidation potential of the magnesium salt included in the electrolyte solution that is described above as disposed between the positive electrode and the negative electrode may be in a range of about 2.5 V to about 3.5 V (vs. Mg/Mg$^{2+}$). For example, an oxidation potential of the magnesium salt included in the electrolyte solution may be in a range of about 2.8 V to about 3.3 V (vs. Mg/Mg$^{2+}$). Since the magnesium salt has a wide range of oxidation potential, reversibility between deposition and dissolution may be increased, and thus lifespan characteristics may be improved.

A separator may be additionally disposed between the positive electrode and the negative electrode.

The separator is not specifically limited, and may have any composition durable in an operation environment of the magnesium battery. For example, the separator may be a polymer non-woven fabric, such as polypropylene-based non-woven fabric, or polyphenylene sulfide-based non-woven fabric, a porous film of an olefin-based polymers, such as polypropylene or polyethylene, which may be used in a combination of at least two thereof.

The separator may have low resistance to migration of ions in an electrolyte and have an excellent electrolyte-retaining ability. Examples of the separator are glass fiber, polyester, Teflon, polytetrafluoroethylene (PTFE), and a combination thereof, each of which may be a non-woven or woven fabric.

For example, the separator may be manufactured as follows.

A polymer resin, a filler, and a solvent may be mixed together to prepare a separator composition. Then, the separator composition may be directly coated on the anode active material layer, and then dried to form the separator. Alternatively, the separator composition may be cast on a support and then dried to form a separator film, which may then be separated from the support and laminated on the anode active material layer to form the separator.

The polymer resin for manufacturing the separator is not specifically limited, and may be any material that is commonly used as a binder for electrode plates. Examples of the polymer resin are polyethylene, polypropylene, a vinylidenefluoride/hexafluoropropylene copolymer, polyvinylidene fluoride (PVDF), polyacrylonitrile, polymethylmethacrylate, and a mixture thereof. The filler for the separator may be, for example, inorganic particles. The solvent may be any of common solvents available in art known as capable of dissolving the polymer resin and forming pores in the polymer resin during drying.

In some other embodiments, the separator may be manufactured by any of a variety of methods known in the art, and then laminated on the anode active material layer. In some embodiments, the separator may be manufactured using a dry process, which may involve melting and pressing polypropylene or polyethylene to form a film, annealing the film at a low temperature, growing a crystal domain in the film, drawing the film to extend an amorphous domain in the film, thereby forming a microporous membrane as a separator. In some other embodiments, the separator may be formed using a wet process, which may involve mixing polypropylene or polyethylene with a low-molecular weight material, for example, a hydrocarbon solvent, forming a film from the mixture, the film being embedded with amorphous island phases formed from the solvent or the low-molecular weight material, and removing the island phases of the solvent or low-molecular weight material with another volatile solvent, thereby forming a microporous membrane.

To control the strength or hardness, and thermal shrinkage rate of the separator, an additive, for example, non-conductive particles, a filler, or a fibrous compound may be further added to the separator. For example, the separator may further include inorganic particles. The further inclusion of the inorganic particles may improve oxidation resistance of the separator and suppress deterioration of battery characteristics. For example, the inorganic particles may be alumina ($Al_2O_3$), silica ($SiO_2$), or titania ($TiO_2$) particles. The inorganic particles may have an average particle diameter of from about 10 nanometers (nm) to about 5 μm. When the average particle diameter of the inorganic particles is less than 10 nm, an effect of adding the inorganic particles may be negligible due to the poor crystalline characteristics of the inorganic particles. When the average particle diameter of the inorganic particle is larger than 5 μm, the inorganic particles may not be difficult to be diffused.

To increase the tearing strength and mechanical strength of the separator, the separator may be manufactured to have a multi-layer structure including at least one polymer layer, for example, as a polyethylene/polypropylene laminate, a polyethylene/polypropylene/polyethylene laminate, or a non-woven fabric/polyolefin laminate.

FIG. 1 is a schematic view of the magnesium battery 1 according to an embodiment. As shown in FIG. 1, the magnesium battery 1 includes a positive electrode 3, a negative electrode 2, and a separator 4. The positive electrode 3, the negative electrode 2, and the separator 4 are wound or folded, and then accommodated in a battery case 5. Subsequently, an organic electrolyte solution is injected into the battery case 5, and the battery case 5 is then sealed by a cap assembly 6, thereby completing the manufacture of the magnesium battery 1. The battery case 5 may be a cylindrical type, a rectangular type, or a thin-film type. In some embodiments, the magnesium battery 1 may be a large thin-film type battery. For example, the magnesium battery 1 may be a magnesium ion battery.

A separator may be disposed between the positive electrode and the negative electrode to form a battery assembly. Alternatively, the battery assembly may be stacked in a bi-cell structure and impregnated with an organic electrolyte solution. The resultant is put into a pouch and hermetically sealed, thereby completing the manufacture of a magnesium polymer battery.

Alternatively, a plurality of battery assemblies may be stacked to form a battery pack, which may be used in any device that requires high output, for example, in a laptop computer, a smart phone, electric vehicle, and the like.

The magnesium battery may have high storage stability and high thermal stability, and thus may be applicable in an energy storage system (ESS), an electric vehicle (EV), or the like, for example, in a hybrid vehicle such as plug-in hybrid electric vehicle (PHEV).

The present inventive concept will be described in further detail with reference to the following examples. These examples are for illustrative purposes only and are not intended to limit the scope of the present inventive concept.

Also, descriptions hereinafter that would have been obvious to one of ordinary skill in the art may be omitted in the specification.

EXAMPLE

Preparation of Electrolyte Solution

Example 1

Preparation of Electrolyte Solution

An electrolyte solution was prepared in a manner as follows with moisture and oxygen at lower than 1 parts per million (ppm) in a glove box of an argon atmosphere.

0.5 M of 2,2,5,5-tetramethyl-1,2,5-azadisilolidine (TMAS), which is represented by Formula 5, was added to 30 ml of tetrahydrofuran (THF) to prepare a TMAS solution (1.0 eq):

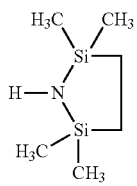

Formula 5

0.5 M ethyl magnesium chloride solution dissolved in THF was slowly added to the TMAS solution (1.0 eq) at a temperature of 10° C. to prepare a mixture. The mixture was stirred at a temperature of 25° C. for 12 hours, and then heat-treated at a temperature of 50° C. for 6 hours to prepare an electrolyte solution of a magnesium salt solution represented by Formula 4:

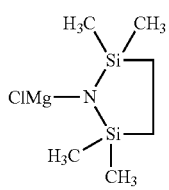

Formula 4

Example 2

Preparation of Electrolyte Solution

1 M AlCl$_3$ solution dissolved in THF was slowly added to the electrolyte solution prepared as Example 1 which includes the magnesium salt represented by Formula 4, to prepare an electrolyte solution added with a Lewis acid, where a molar ratio of the magnesium salt represented by Formula 4 to AlCl$_3$ in the electrolyte solution was 3:1.

Example 3

Preparation of Electrolyte Solution 5 ml of 0.5 M AlCl$_3$ solution dissolved in THF was slowly added to the electrolyte solution prepared as Example 1 which includes the magnesium salt represented by Formula 4, to prepare an electrolyte solution added with a Lewis acid, where a molar ratio of the magnesium salt represented by Formula 4 to AlCl$_3$ in the electrolyte solution was 2:1.

Example 4

Preparation of Electrolyte Solution 10 ml of 0.5 M AlCl$_3$ solution dissolved in THF was slowly added to the electrolyte solution prepared as Example 1 which includes the magnesium salt represented by Formula 4, to prepare an electrolyte solution added with a Lewis acid, where a molar ratio of the magnesium salt represented by Formula 4 to AlCl$_3$ in the electrolyte solution was 1:1.

Comparative Example 1

Preparation of Electrolyte Solution 0.5 M bis(trifluoromethylsulfonyl)imide magnesium chloride which is a magnesium salt represented by Formula 6, was added to 30 ml of THF to prepare an electrolyte solution including magnesium salt represented by Formula 6:

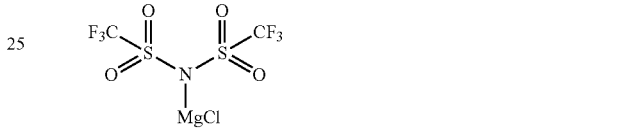

Formula 6

Comparative Example 2

Preparation of Electrolyte Solution

2 M phenyl magnesium chloride was added to 20 ml of THF to prepare an electrolyte solution including phenyl magnesium chloride as a magnesium salt. 1M AlCl$_3$ solution dissolved in THF was slowly added to the electrolyte solution including phenyl magnesium chloride to prepare an electrolyte solution added with a Lewis acid, where a molar ratio of the phenyl magnesium chloride as the magnesium salt to AlCl$_3$ in the electrolyte solution was 2:1.

Preparation of Magnesium Battery

Example 5

Preparation of Magnesium Battery 8 parts by weight of Mo$_3$S$_4$ as a positive electrode active material, 1 part by weight of ketjen black (EC-600JD), and 1 part by weight of polyvinylidene fluoride PVdF were mixed, and the mixture was mixed with N-methyl-2-pyrrolidone (NMP) to prepare slurry for a positive electrode. Then, the slurry was coated a stainless steel foil having a thickness of 10 μm, dried, and pressed by using a presser to prepare a positive electrode. The positive electrode, a negative electrode of a magnesium film, a glass filter (Whatman, GF/F) separator, and the electrolyte solution prepared in Example 1 were used to prepare a coin cell type of a magnesium battery.

Examples 6 to 8

Preparation of Magnesium Batteries

Magnesium batteries of a coin cell type were manufactured in the same manner as in Example 5, except that the electrolyte solutions of Examples 2 to 4 were used instead of the electrolyte solution of Example 1, respectively.

Comparative Examples 3 and 4

Preparation of Magnesium Batteries

Magnesium batteries of a coin cell type were manufactured in the same manner as in Example 5, except that the electrolyte solutions of Comparative Examples 1 and 2 were used instead of the electrolyte solution of Example 1, respectively.

Oxidation Potential and Cyclic Voltammetry Measurement

Evaluation Example 1

Oxidation Potential and Cyclic Voltammetry Measurement

An oxidation potential and cyclic voltammetry of a magnesium battery were measured by using a potentiometer (an electrochemical interface, 1287 ECI, available from Solartron analytical). A Pt disc was used as a working electrode, and a magnesium metal foil was used as a counter electrode. A glass filter was inserted between the working electrode and the counter electrode, and thus working electrode and the counter electrode were fixed to face each other. Also, as a reference electrode, a magnesium metal wire was fixed at a location that does not contact any of the working electrode or the counter electrode. The working electrode, the counter electrode, and the reference electrode were put into the electrolyte solutions prepared in Examples 1 to 3 and Comparative Examples 1 and 2 to prepare batteries of a beaker type. Oxidation potentials of the electrolyte solutions prepared in Examples 1 to 3 and Comparative Examples 1 and 2 were measured by scanning the working electrodes included in the batteries of a beaker type at a scanning rate of about 10 millivolts per second (mV/sec). The results are shown in Table 1 and FIG. 2.

TABLE 1

| | Oxidation potential ($V_{ox}$, V) |
|---|---|
| Example 1 | 2.8 |
| Example 2 | 3.2 |
| Example 3 | 3.3 |
| Comparative Example 1 | 3.0 |
| Comparative Example 2 | 3.0 |

Figure 2:
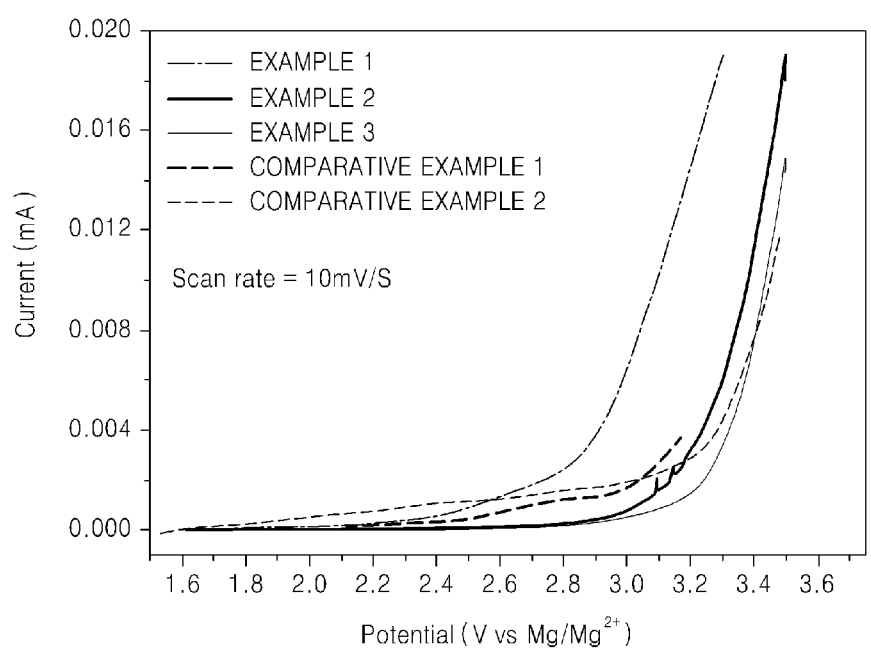
FIG. 2 is a graph of current (milliamperes, mA) versus potential (volts versus Mg/Mg$^{2+}$, V) showing the results of oxidation potential measurement with respect to electrolyte solutions prepared in Examples 1 to 3 and Comparative Examples 1 and 2.

Referring to Table 1 and FIG. 2, oxidation potentials of the electrolyte solutions prepared in Examples 1 to 3 were within a range of about 2.8 V to about 3.3 V (vs. Mg/Mg$^{2+}$), and oxidation potentials of the electrolyte solutions prepared in Comparative Examples 1 and 2 were about 3.0 V (vs. Mg/Mg$^{2+}$). Thus, it may be confirmed that an upper limit range of the oxidation potentials of the electrolyte solutions prepared in Examples 1 to 3 was about 0.3 V increased compared to a range of the oxidation potentials of the electrolyte solutions prepared in Comparative Examples 1 and 2.

Figure 3:
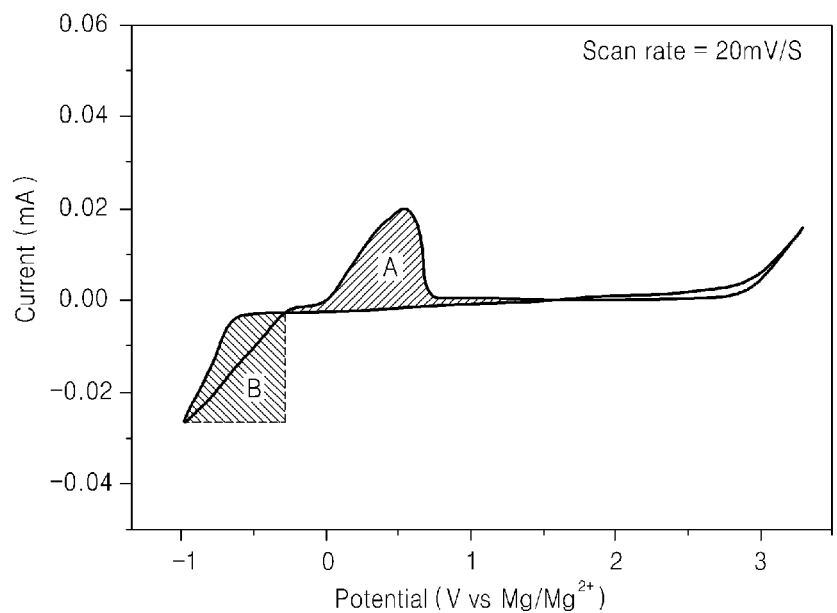
FIG. 3 is a graph of current (milliamperes, mA) versus potential (volts versus Mg/Mg$^{2+}$, V) showing the results of cyclic voltammetry measurement with respect to the electrolyte solution prepared in Example 1.
Figure 4:
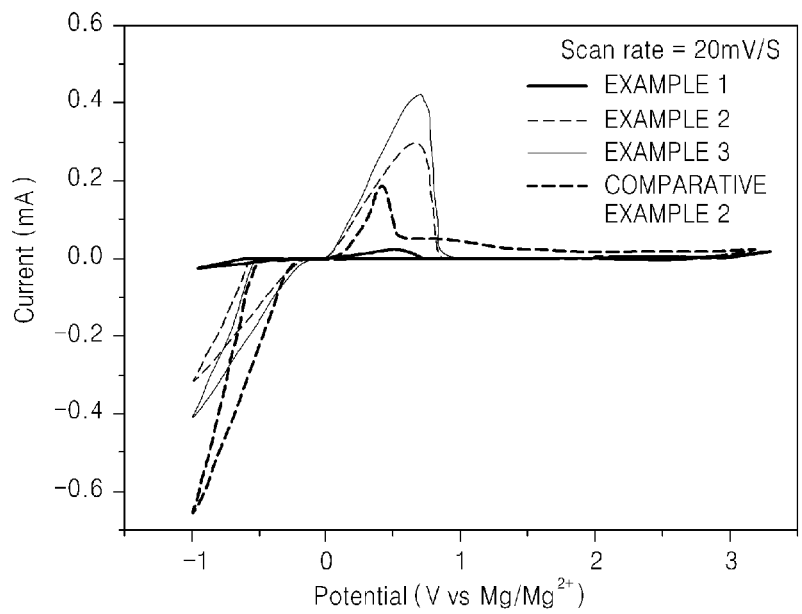
FIG. 4 is a graph of current (milliamperes, mA) versus potential (volts versus Mg/Mg$^{2+}$, V) showing the results of cyclic voltammetry measurement with respect to the electrolyte solutions prepared in Examples 1 to 3 and Comparative Examples.

Also, oxidation reduction characteristic of an electrolyte solution, that is, reversibility between dissolution and deposition of magnesium, was evaluated by scanning the working electrodes included in the batteries of a beaker type at a scanning rate of 20 mV/sec with respect to the electrolyte solutions prepared in Examples 1 to 3 and Comparative Example 2. The results are shown in FIGS. 3 and 4. Also, Equation 1 was used to calculate an efficiency for evaluation of the reversibility, and the results are shown in Table 2.

For example, when FIG. 3 is used as an example, the terms "an area (A) of a CV curve during magnesium dissolution" and "a trapezoid-shaped area (B) of a CV curve during magnesium deposition", each respectively, correspond to areas "A" and "B" of the crease pattern shown in FIG. 3.

Efficiency(%)=[(an area ($A$) of a $CV$ curve during magnesium dissolution)/(a trapezoid-shaped area ($B$) of a $CV$ curve during magnesium deposition)]×100  Equation 1

TABLE 2

| | Efficiency (%) |
|---|---|
| Example 1 | 51 |
| Example 2 | 66 |
| Example 3 | 69 |
| Comparative Example 2 | 40 |

Referring to Table 2 and FIGS. 3 and 4, electrolyte efficiencies of the electrolyte solutions prepared in Examples 1 to 3 were, each respectively, 51%, 66%, and 69%, and an efficiency of the electrolyte solution prepared in Comparative Example 2 was 40%. Thus, it may be confirmed that the efficiencies of the electrolyte solutions prepared in Examples 1 to 3 were about 10% to 30% higher compared to the efficiency of the electrolyte solution prepared in Comparative Example 2.

In this regard, it may be confirmed that oxidation reduction characteristics, i.e., reversibility between dissolution and deposition of magnesium, of the electrolyte solutions prepared in Examples 1 to 3 were improved compared to oxidation reduction characteristics, i.e., reversibility between dissolution and deposition of magnesium, of the electrolyte solution prepared in Comparative Example 2.

However, referring to Table 1, the oxidation potential of the electrolyte prepared in Example 1 was 2.8 V (vs. Mg/Mg$^{2+}$) which was lower than the oxidation potential, 3.0 V (vs. Mg/Mg$^{2+}$), of the electrolyte solution prepared in Comparative Example 2. However, referring to Table 2, oxidation reduction characteristics of the electrolyte solution prepared in Example 1 was better than oxidation reduction characteristics of the electrolyte solution prepared in Comparative Example 2. This is because the electrolyte solution prepared in Example 1 may have more MgCl$^+$ cations than RMg$^+$ cations at an equilibrium state compared to that of the electrolyte solution prepared in Comparative Example 2. Thus a magnesium deposition path of the electrolyte solution prepared in Example 1 may be stabilized. Therefore, the electrolyte solution prepared in Example 1 may be electrochemically stabilized.

As described above, according to the one or more of the above embodiments, an electrolyte solution and a magnesium battery including the electrolyte solution include a magnesium salt represented by Formula 1 having a non-nucleophilic structure of a low HOMO energy level. Thus, the electrolyte solution may be electrochemically stable, and lifespan characteristics of the electrolyte solution may be improved as reversibility between deposition and dissolution of magnesium increases by having an oxidation potential in a wide range. Also, since a method of preparing the electrolyte solution may omit a separate crystallization process, a yield of the electrolyte solution may be increased, and a mass production of the electrolyte solution may be possible.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. An electrolyte solution comprising:
a non-aqueous organic solvent; and
a magnesium salt represented by Formula 1:

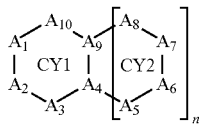

Formula 1 wherein, in Formula 1,
CY1 is a C5 to C6 aromatic ring, a C5 to C6 heterocyclic ring, or a C5 to C6 alicyclic ring, and
CY2 is a C4 to C6 aromatic ring, a C4 to C6 heterocyclic ring, or a C4 to C6 alicyclic ring;
n is 0 or 1;
$A_1$ is

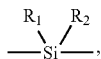

$A_2$ is

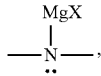

and
$A_3$ is

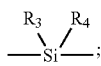

$A_4$ and $A_9$ are each independently

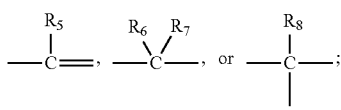

$A_5$ and $A_6$ are each independently

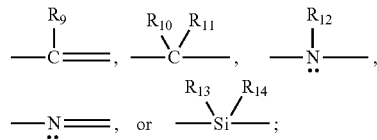

$A_7$ and $A_8$ are each independently a single bond,

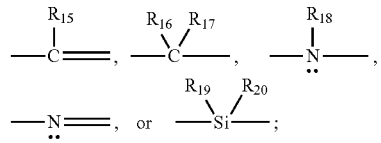

$A_{10}$ is a single bond,

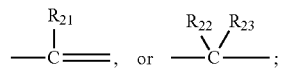

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and
X is a halogen atom.

2. The electrolyte solution of claim 1 comprising a magnesium salt represented by Formula 2:

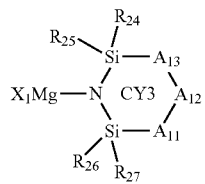

Formula 2 wherein, in Formula 2,
CY3 is a C5 to C6 aromatic ring, a C5 to C6 heterocyclic ring, or a C5 to C6 alicyclic ring;
$A_{11}$ and $A_{12}$ are each independently

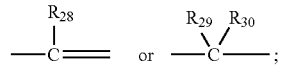

$A_{13}$ is a single bond,

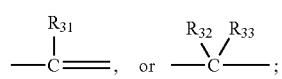

$R_{24}$ to $R_{33}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and $X_1$ is a halogen atom.

3. The electrolyte solution of claim 1 comprising a magnesium salt represented by Formula 3:

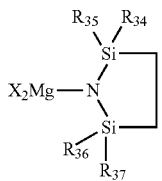

Formula 3 wherein, in Formula 3, $R_{34}$ to $R_{37}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and $X_2$ is a halogen atom.

4. The electrolyte solution of claim 1 comprising a magnesium salt represented by Formula 4:

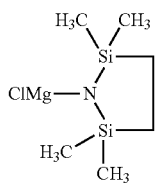

Formula 4

5. The electrolyte solution of claim 1, wherein a concentration of the magnesium salt in the electrolyte solution is in a range of about 0.01 M to about 2.0 M.

6. The electrolyte solution of claim 1, wherein the non-aqueous organic solvent comprises at least one selected from tetrahydrofuran, 2-methyltetrahydrofuran, 2-methylfuran, ethyl alcohol, 4-methyldioxolane, 1,3-dioxolane, 1,4-dioxane, 1,2-dimethoxyethane, dimethoxymethane, ethylenecarbonate, propylenecarbonate, γ-butyrolactone, methylformate, sulfolane, 3-methyl-2-oxazolidinone, dimethyl carbonate, hexane, toluene, dimethyl ether, diethyl ether, methylethyl ether, propyl ether, methylpropyl ether, isopropyl ether, methylisopropyl ether, ethylene glycol dimethyl ether, diethylene glycol dimethyl ether, bis-2-methoxy ethyl ether, and tetraethylene glycol.

7. The electrolyte solution of claim 1, further comprising a Lewis acid.

8. The electrolyte solution of claim 7, wherein the Lewis acid comprises at least one selected from $AlCl_3$, $AlCl_xR'_{3-x}$, $BCl_3$, $BCl_xR'_{3-x}$, and $B(OR')_3$, wherein x is 0, 1, 2, or 3, and R' is a substituted or unsubstituted linear C1-C10 alkyl group, a substituted or unsubstituted branched C3-C10 alkyl group, a substituted or unsubstituted C3-C10 cycloalkyl group, or a substituted or unsubstituted C6-C10 aryl group.

9. The electrolyte solution of claim 7, wherein a molar ratio of the magnesium salt represented by Formula 1 to the Lewis acid is in a range of 1:10 to 10:1.

10. The electrolyte solution of claim 7, wherein a molar ratio of the magnesium salt represented by Formula 1 to the Lewis acid is in a range of 1:8 to 8:1.

11. The electrolyte solution of claim 7, wherein a molar ratio of the magnesium salt represented by Formula 1 to the Lewis acid is in a range of 1:3 to 3:1.

12. A magnesium battery comprising:

a positive electrode comprising a positive electrode active material for intercalating or deintercalating magnesium ions;

a negative electrode comprising a negative electrode active material for intercalating or deintercalating magnesium ions; and the electrolyte solution of claim 1 disposed between the positive electrode and the negative electrode.

13. The magnesium battery of claim 12, wherein an oxidation potential of a magnesium salt in the electrolyte solution is in a range of about 2.5 Volts to about 3.5 Volts (vs. $Mg/Mg^{2+}$).

14. The magnesium battery of claim 12, wherein the positive electrode active material comprises at least one selected from an oxide compound of a metal element, a halogen compound of a metal element, a sulfide compound of a metal element, a selenium compound of a metal element, a phosphate compound of a metal element, a phosphide compound of a metal element, and a diboride compound of a metal element.

15. The magnesium battery of claim 14, wherein the metal element comprises at least one selected from scandium, titanium, vanadium, chromium, manganese, iron, cobalt, molybdenum, lead, ruthenium, tungsten, zirconium, nickel, copper, and zinc.

16. The magnesium battery of claim 12, wherein the negative electrode active material comprises at least one selected from a magnesium metal, a magnesium-based alloy, a magnesium intercalating compound, and a carbon-based material.

17. A method of preparing an electrolyte solution, the method comprising contacting a magnesium salt represented by Formula 1 and a non-aqueous organic solvent to prepare an electrolyte solution comprising the magnesium salt represented by Formula 1:

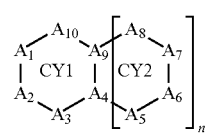

Formula 1 wherein, in Formula 1,

CY1 is a C5 to C6 aromatic ring, a C5 to C6 heterocyclic ring, or a C5 to C6 alicyclic ring, and CY2 is a C4 to C6 aromatic ring, a C5 to C6 heterocyclic ring, or a C5 to C6 alicyclic ring;

n is 0 or 1;

$A_1$ is

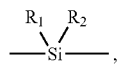

$A_2$ is

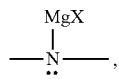

and
$A_3$ is

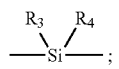

$A_4$ and $A_9$ are each independently

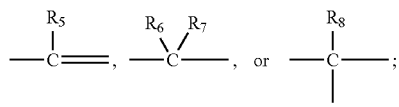

$A_5$ and $A_6$ are each independently

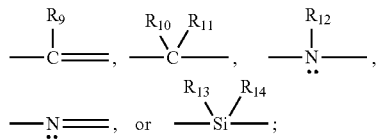

$A_7$ and $A_8$ are each independently a single bond,

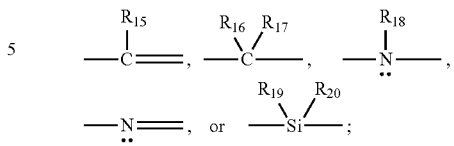

$A_{10}$ is a single bond,

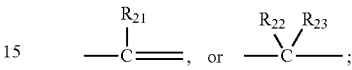

$R_1$ to $R_{23}$ are each independently a hydrogen atom, a halogen atom, a substituted or unsubstituted linear C1-C10 alkyl group, a substituted or unsubstituted branched C3-C10 alkyl group, a substituted or unsubstituted C3-C10 cycloalkyl group, a substituted or unsubstituted C6-C10 aryl group, a substituted or unsubstituted C6-C10 heteroaryl group, or a combination thereof; and X is a halogen atom.

18. The method of claim 17, further comprising adding a Lewis acid solution to the electrolyte solution comprising a magnesium salt represented by Formula 1.

19. The method of claim 18, wherein a molar ratio of the magnesium salt represented by Formula 1 to the Lewis acid in the electrolyte solution is in a range of 1:10 to 10:1.

20. The method of claim 17, wherein the preparing the electrolyte solution comprising the magnesium salt and the adding a Lewis acid solution to the electrolyte solution are performed under an inert atmosphere.

* * * * *